US011408337B2

(12) United States Patent
Geliot et al.

(10) Patent No.: US 11,408,337 B2
(45) Date of Patent: Aug. 9, 2022

(54) AIRCRAFT PYLON COMPRISING A COAXIAL HEAT EXCHANGER

(71) Applicant: Airbus Operations (S.A.S.), Toulouse (FR)

(72) Inventors: Jean Geliot, Toulouse (FR); Adeline Soulie, Verdun sur Garonne (FR)

(73) Assignee: Airbus Operations (S.A.S.), Toulouse (FR)

( * ) Notice: Subject to any disclaimer, the term of this patent is extended or adjusted under 35 U.S.C. 154(b) by 871 days.

(21) Appl. No.: 16/253,548

(22) Filed: Jan. 22, 2019

(65) Prior Publication Data

US 2019/0226400 A1 Jul. 25, 2019

(30) Foreign Application Priority Data

Jan. 24, 2018 (FR) ...................................... 1850565

(51) Int. Cl.
*F02C 6/04* (2006.01)
*B64D 27/26* (2006.01)
(Continued)

(52) U.S. Cl.
CPC ............... *F02C 6/04* (2013.01); *B64D 13/08* (2013.01); *B64D 27/18* (2013.01); *B64D 27/26* (2013.01); *B64D 29/02* (2013.01); *B64D 33/02* (2013.01); *B64D 33/08* (2013.01); *B64D 33/10* (2013.01); *F01D 25/12* (2013.01); *F01D 25/24* (2013.01); *F02C 6/08* (2013.01); *F02C 7/047* (2013.01);
(Continued)

(58) Field of Classification Search
CPC ...... F02C 6/04; F02C 6/06; F02C 6/08; F02C 7/18; F02C 7/185; B64D 27/26; B64D 33/08; F01D 25/12; F01D 25/24
See application file for complete search history.

(56) References Cited

U.S. PATENT DOCUMENTS 3,201,938 A * 8/1965 Isadore ..................... F02C 7/08
165/142
5,729,969 A 3/1998 Porte
(Continued)

FOREIGN PATENT DOCUMENTS

EP 1 365 203 A1 11/2003
EP 3712404 A1 * 9/2020 ................ F02C 7/14
(Continued)

OTHER PUBLICATIONS

El Maakoul et al., "Numerical investigation of thermohydraulic performance of air to water double-pipe heat exchanger with helical fins," Applied Thermal Engineering, Pergamon, Oxford, GB, vol. 127, pp. 127-139 (Aug. 7, 2017).
(Continued)

*Primary Examiner* — Craig Kim
(74) *Attorney, Agent, or Firm* — Jenkins, Wilson, Taylor & Hunt, PA

(57) ABSTRACT

An aircraft pylon including a heat exchange device having a heat exchanger which includes a first circuit portion ducting a flow of hot air tapped off an engine of the aircraft and a second circuit portion ducting a flow of cold air, the first and second circuit portions of the heat exchanger being coaxial, separated by at least one partition forming an exchange surface, and positioned, at least partially, in the primary structure of the pylon.

17 Claims, 2 Drawing Sheets

(51) Int. Cl.

| | | |
|---|---|---|
| *B64D 29/02* | (2006.01) | |
| *B64D 33/08* | (2006.01) | |
| *F01D 25/24* | (2006.01) | |
| *F01D 25/12* | (2006.01) | |
| *F02C 7/18* | (2006.01) | |
| *F02C 6/08* | (2006.01) | |
| *B64D 33/10* | (2006.01) | |
| *F28D 7/10* | (2006.01) | |
| *B64D 27/18* | (2006.01) | |
| *B64D 13/08* | (2006.01) | |
| *B64D 33/02* | (2006.01) | |
| *F28F 1/06* | (2006.01) | |
| *F02C 7/047* | (2006.01) | |
| *F28D 7/14* | (2006.01) | |
| *F28D 21/00* | (2006.01) | |

(52) U.S. Cl.
CPC .............. *F02C 7/185* (2013.01); *F28D 7/106* (2013.01); *F28F 1/06* (2013.01); *B64D 2033/024* (2013.01); *F05D 2220/323* (2013.01); *F05D 2260/213* (2013.01); *F28D 7/14* (2013.01); *F28D 2021/0021* (2013.01)

(56) References Cited

U.S. PATENT DOCUMENTS

| | | | |
|---|---|---|---|
| 6,134,880 A * | 10/2000 | Yoshinaka | F28D 9/0018 60/806 |
| 6,715,713 B2 | 4/2004 | Marche | |
| 7,607,308 B2 * | 10/2009 | Kraft | F02C 7/32 60/785 |
| 7,856,824 B2 * | 12/2010 | Anderson | F02C 7/14 60/785 |
| 8,024,935 B2 * | 9/2011 | Hoover | F02K 3/06 60/785 |
| 8,161,755 B2 * | 4/2012 | Marche | F28D 7/0075 244/57 |
| 10,036,329 B2 * | 7/2018 | Suciu | F01D 17/105 |
| 11,215,118 B2 * | 1/2022 | Medda | F02C 6/08 |
| 11,268,526 B2 * | 3/2022 | Roach | B32B 27/36 |
| 2007/0034351 A1 * | 2/2007 | Marche | F28D 21/0014 165/41 |
| 2009/0188232 A1 * | 7/2009 | Suciu | B64D 27/18 60/785 |
| 2009/0301101 A1 * | 12/2009 | Marche | F28D 7/00 60/785 |
| 2015/0239581 A1 * | 8/2015 | Tateiwa | B64D 33/08 244/54 |
| 2022/0042639 A1 * | 2/2022 | Grande | H05B 3/18 |

FOREIGN PATENT DOCUMENTS

| | | |
|---|---|---|
| FR | 2 734 319 A1 | 11/1996 |
| WO | WO 2007/012725 A2 | 2/2007 |
| WO | WO 2018/002855 A1 | 1/2018 |
| WO | WO-2021152318 A1 * | 8/2021 |

OTHER PUBLICATIONS

French Search Report for Application No. 1850565 dated May 3, 2018.

* cited by examiner

AIRCRAFT PYLON COMPRISING A COAXIAL HEAT EXCHANGER

CROSS-REFERENCE TO RELATED APPLICATION

This application claims priority to French Patent Application 18 50565 filed on Jan. 24, 2018, the entire disclosure of which is incorporated by reference herein.

TECHNICAL FIELD

The disclosure herein relates to an aircraft pylon comprising a coaxial heat exchanger.

BACKGROUND

In one configuration, an aircraft 10 comprises several engine assemblies 12 positioned under the wing structure 14.

As illustrated in FIGS. 1 and 2, an engine assembly 12 comprises:
 an engine 16 through which a primary flow of air circulates,
 a nacelle 18 positioned around the engine 16 in order therewith to delimit an annular duct through which a secondary flow 19 of cold air flows, and
 a pylon 20 which provides the connection between the engine 16 and the wing structure 14.

The engine 16 comprises, in the direction of flow of the primary flow embodied by the arrow 17, a large-dimension fan case 16.1 delimiting an annular fan duct, a smaller-dimension central case 16.2 enclosing the "core" zone of the engine 16 through which the primary flow passes, and a larger-dimension outlet case 16.3 via which the primary flow is expelled.

The pylon 20 comprises a rigid primary structure 22 which amongst other things transmits load between the engine 16 and the rest of the aircraft 10, and a secondary structure 24 which envelopes the primary structure 22 and limits the drag of the pylon 20.

As illustrated in FIG. 2, each engine assembly 12 comprises at least one heat exchange device 26 configured to cool hot air tapped off the compression stages of the engine 16 and destined for the aircraft pressurization and air conditioning systems and/or wing deicing system.

According to an embodiment, each heat exchange device 26 comprises:
 a heat exchanger 28 which has a parallelepipedal shape and has a first, hot air, circuit connecting a first inlet 30 and a first outlet 32 and a second, cold air, circuit connecting a second inlet 34 and a second outlet 36,
 a hot air supply pipe 38 which is configured to tap hot air off the engine 16 and which passes through the primary structure 22 of the pylon and is connected to the first inlet 30,
 a hot air outlet duct 40 connected to the first outlet 32,
 a cold air supply duct 42 connected to the second inlet 34, which opens into the secondary flow 19 via a scoop 44 positioned under the heat exchanger 28 and configured to tap cold air from the secondary flow 19,
 an exhaust duct 46 connected to the second outlet 36 and which opens via a grating 48 made in the secondary structure 24 of the pylon, positioned above the heat exchanger 28 and configured to discharge the air to outside the aircraft.

In order to regulate the temperature of the hot air, the heat exchange device 26 comprises a regulating system 50 configured to adjust the flow rate of the cold air and positioned upstream of the heat exchanger 28, on the cold air supply duct 42.

According to a known configuration, the heat exchanger 28 is a plate exchanger positioned in a zone situated above the primary structure 22 and in the secondary structure 24 of the pylon.

As aircraft engines are becoming increasingly large in diameter and positioned increasingly close to the wing structure in order to improve the aerodynamic performance and maintain a minimum ground clearance, the zone situated above the primary structure 22 and below the secondary structure 24 of the pylon is becoming increasingly restricted, and this is tending to make incorporating the heat exchange device 26 increasingly complex.

SUMMARY

The disclosure herein seeks to overcome all or some of the disadvantages of the prior art.

To this end, one subject of the disclosure herein is an aircraft pylon comprising:
 a primary structure configured to connect an aircraft engine and a wing structure,
 a secondary structure comprising an aerodynamic fairing configured to envelope the primary structure on the outside of a nacelle surrounding the engine,
 a bifurcation comprising an aerodynamic fairing configured to envelope the primary structure in a secondary flow ducted between the nacelle and the engine,
 a heat exchange device comprising:
  a heat exchanger which comprises a first circuit portion ducting a flow of hot air, which has a first inlet and a first outlet, and a second circuit portion ducting a flow of cold air, which has a second inlet and a second outlet,
  a first duct which has a first end connected to the first inlet and is configured to tap the flow of hot air off the engine,
  a second duct which has a first end connected to the first outlet and is configured to convey the flow of cooled hot air towards at least one item of aircraft equipment.

According to the disclosure herein, the first and second circuit portions of the heat exchanger are coaxial, separated by at least one partition that forms an exchange surface, and positioned, at least partially, in the primary structure of the pylon.

The fact that the heat exchanger is of the coaxial type means that it can be positioned, at least partially, in the primary structure in the manner of the hot air supply duct of the prior art. Thus, the impact its integration has on the aerodynamic shapes of the fairing of the secondary structure is limited.

According to another feature, the first circuit portion ducting the hot air is positioned inside the second circuit portion ducting the cold air.

According to an embodiment, the first circuit portion has a cross section configured to increase the exchange surface area of the partition and/or the partition has additional exchange surfaces.

According to another feature, the first inlet and the first outlet are positioned respectively below and above the primary structure of the pylon, and the second inlet and the second outlet are positioned respectively above and below the primary structure of the pylon so that the flow of hot air circulating through the first circuit portion flows countercurrentwise with respect to the flow of cold air circulating in the second circuit portion.

According to an embodiment, the heat exchange device comprises a third duct which has a first end connected to the second inlet and, at a second end, has a scoop that is open towards the front so that part of the secondary flow naturally enters the scoop, and a fourth duct which has a first end connected to the second outlet and is configured to deliver the cold air into the engine.

According to a configuration, the scoop is positioned at a leading edge of the bifurcation, above the primary structure.

According to an embodiment, the first duct has, at its first end connected to the first inlet of the heat exchanger, a first elbow which directs the rest of the first duct towards the front, the second duct has, at its first end connected to the first outlet of the heat exchanger, a second elbow which directs the rest of the second duct towards the rear, the third duct has, at its first end connected to the second inlet of the heat exchanger, a third elbow which directs the rest of the third duct towards the front, the second duct passing through the wall of the third duct on the external radius of the third elbow, and the fourth duct has, at its first end connected to the second outlet of the heat exchanger, a fourth elbow which directs the rest of the fourth duct towards the rear, the first duct passing through the wall of the fourth duct on the outside radius of the fourth elbow.

According to a feature, the heat exchanger comprises a fixing system for connecting it to the primary structure.

According to another feature, the heat exchange device comprises an orifice-plate regulating system configured to adjust the flow rate of the flow of cold air.

Another subject of the disclosure herein is an aircraft comprising a pylon according to one of the preceding features.

BRIEF DESCRIPTION OF THE DRAWINGS

Further features and advantages will become apparent from the following description of the disclosure herein, which description is given solely by way of example with reference to the attached, example drawings in which.

DETAILED DESCRIPTION

Figure 1:
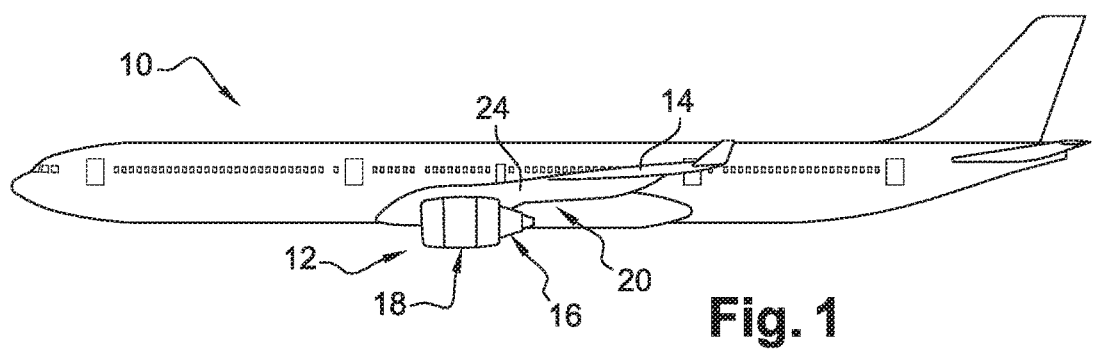
FIG. 1 is a side view of an aircraft.
Figure 2:
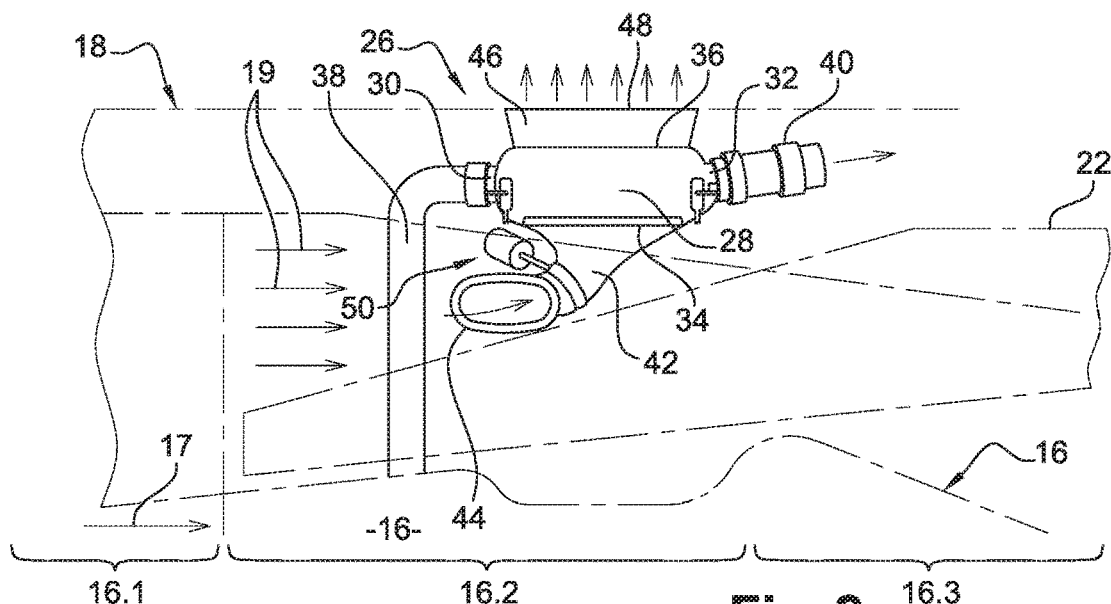
FIG. 2 is a view of a heat exchange device illustrating an embodiment of the prior art.
Figure 3:
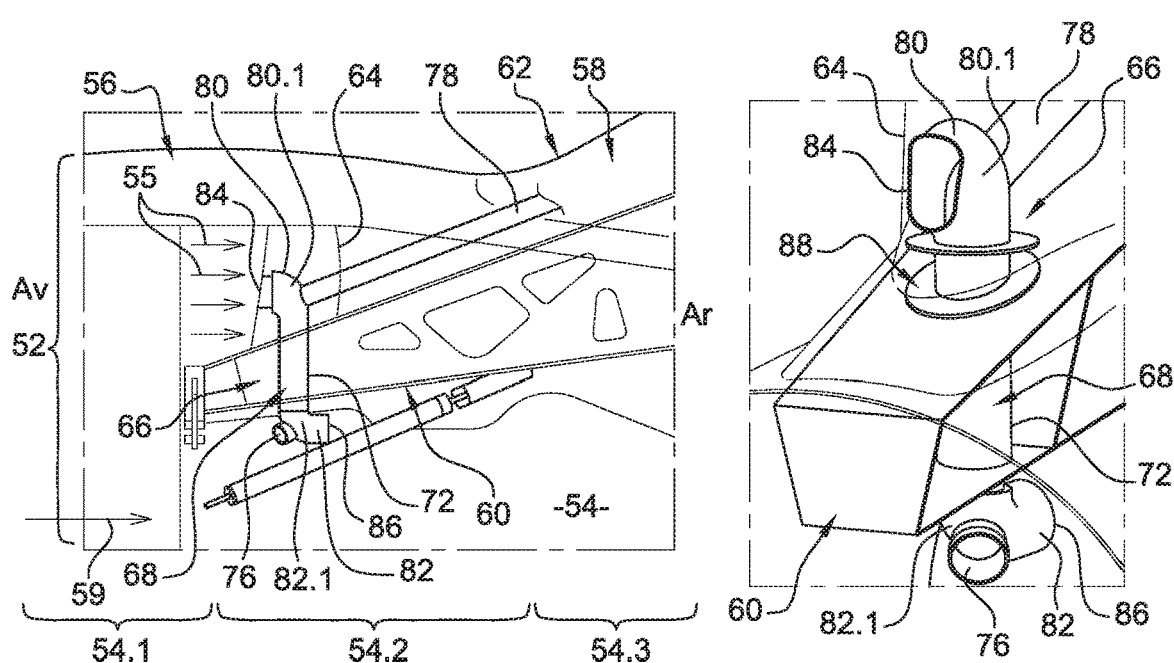
FIG. 3 is a partial side view of an engine assembly illustrating an embodiment of the disclosure herein.

FIG. 3 depicts an engine assembly 52 which comprises:
an engine 54 comprising a zone referred to in aeronautical parlance as the "core" zone, through which a primary air flow circulates;
a nacelle 56 positioned around the engine 54 in order therewith to delimit an annular duct through which a secondary flow 55 of cold air flows; and
a pylon 58 which provides the connection between the engine 54 and a wing structure of an aircraft.

The engine 54 comprises, in the direction of flow of the primary flow embodied by the arrow 59, a large-dimension fan case 54.1 delimiting an annular fan duct, a smaller-dimension central case 54.2 containing the "core" zone of the engine 54 through which the primary flow passes, and a larger-dimension outlet case 54.3 via which the primary flow is ejected.

The pylon 58 comprises a rigid primary structure 60 which among other things provides the transmission of load between the engine 54 and the rest of the aircraft, and a secondary structure 62 which supports at least a fairing which envelopes the primary structure 60 on the outside of the nacelle 56 and limits the drag of the pylon 58.

Figure 4:
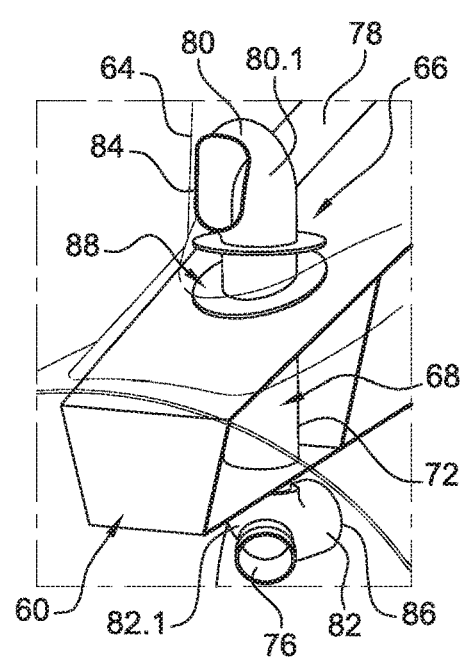
FIG. 4 is a perspective view of a front tip of a primary structure of an aircraft pylon incorporating a heat exchange device, illustrating an embodiment of the disclosure herein.

Between the engine 54 and the nacelle 56, the primary structure 60 of the pylon is positioned in a bifurcation 64 (shown as transparent in FIG. 4) which has an aerodynamic fairing enveloping the primary structure 60 in the secondary flow 55 so as to reduce the disturbances to the secondary flow 55.

All these elements of the engine assembly are not described further because they may be identical to those of the prior art.

For the remainder of the description, the terms front and rear refer to the direction of flow of the air flows inside the engine 54 which enter at the front Av of the engine 54 and leave at the rear Ar of the engine 54.

At least one engine assembly 52 comprises at least one heat exchange device 66 configured to cool hot air tapped off the compression stages of the engine 54 and intended for the aircraft pressurization and air conditioning systems, the wing deicing systems and/or any other system of the aircraft.

According to an embodiment visible in FIGS. 3 through 5 and 7, each heat exchange device 66 comprises a heat exchanger 68 which has a tubular shape, which passes through the primary structure 60 of the pylon and which is positioned at least partially inside the primary structure 60 of the pylon.

According to a favored configuration, the tubular shape of the heat exchanger 68 has an axis A68 oriented approximately vertically. As an alternative, the axis A68 may be positioned in a plane passing through the engine axis and vertical, referred to hereinafter as the vertical mid plane PMV, and be inclined forwards or backwards to a greater or lesser degree.

The heat exchanger 68 comprises a hot air first circuit portion 70 and a cold air second circuit portion 72, the first and second circuit portions 70 and 72 being coaxial and separated by at least one partition 74 that encourages heat exchanges, notably by conduction, between the hot air circulating in the first circuit portion 70 and the cold air circulating in the second circuit portion 72.

According to one configuration, the first circuit portion 70 is positioned inside the second circuit portion 72. Thus, the cold air ducted around outside of the first circuit portion 70, in the second circuit portion 72, forms a thermal barrier protecting the primary structure 60 from the high temperatures of the hot air.

Figure 6:
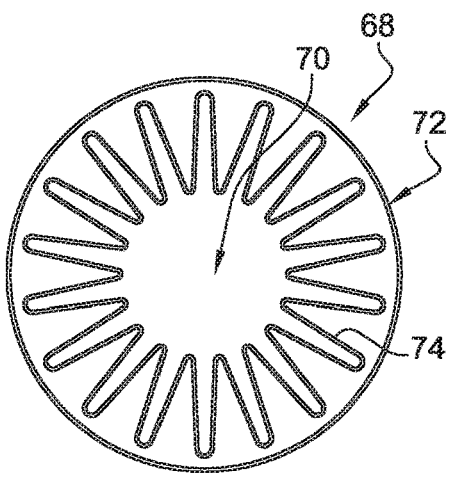
FIG. 6 is a section on line VI-VI of FIG. 5.

According to an embodiment visible in FIG. 6, the second circuit portion 72 is cylindrical and coaxial with the axis A68. The first circuit portion 70 has a cross section, in a plane perpendicular to the axis A68, that is star-shaped in order to increase the exchange surface area of the partition 74. Of course, the disclosure herein is not restricted to this embodiment for the cross section of the first circuit portion 70. To complement this or as an alternative thereto, the partition 74 has additional exchange surfaces, such as fins for example.

According to an embodiment, the partition 74 is made from a material that encourages heat exchanges, such as a ceramic material for example.

The material of the partition 74, the geometry of its cross section and the shapes on the surface of the partition 74 are determined in such a way as to encourage heat exchanges between the hot and cold air flows and as to reduce the dimensions of the heat exchanger 68.

Figure 5:
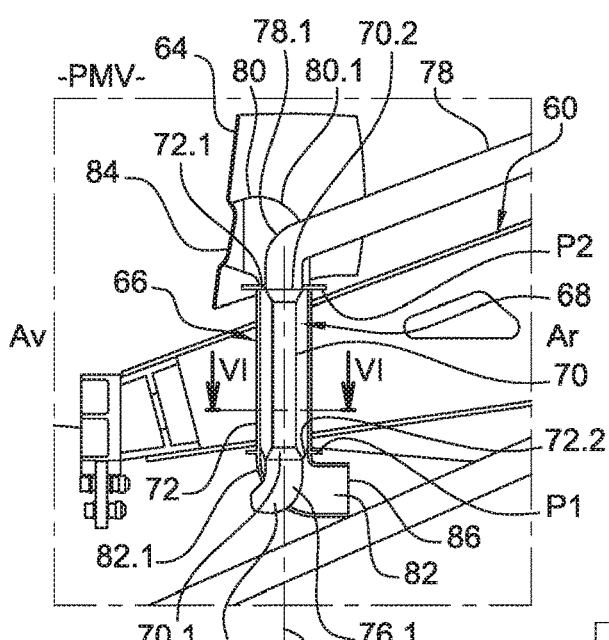
FIG. 5 is a side view of a heat exchange device, illustrating an embodiment of the disclosure herein.

As illustrated in detail in FIG. 5, the first circuit portion 70 comprises a first inlet 70.1 and a first outlet 70.2 which is positioned above the first inlet 70.1, the hot air flow circulating, upwards, from the first inlet 70.1 towards the first outlet 70.2.

According to one configuration, the first inlet 70.1 is positioned below the primary structure 60 of the pylon and the first outlet 70.2 is positioned above the primary structure 60 of the pylon.

The heat exchange device 66 also comprises a first duct 76 which has a first end connected to the first inlet 70.1 and configured to tap hot air off the engine 54, more particularly off the "core" zone of the engine positioned in the central case 54.2; and a second duct 78 which has a first end connected to the first outlet 70.2 and configured to convey the cooled hot air towards at least one item of aircraft equipment that uses hot air.

According to one configuration, the first duct 76 has, at its first end connected to the first inlet 70.1, a first elbow 76.1 which directs the rest of the first duct 76 towards the front. The second duct 78 has, at its first end connected to the first outlet 70.2, a second elbow 78.1 which directs the rest of the second duct 78 towards the rear.

The second circuit portion 72 comprises a second inlet 72.1 and a second outlet 72.2, the flow of cold air circulating from the second inlet 72.1 towards the second outlet 72.2.

According to one feature of the disclosure herein, the flow of hot air circulating in the first circuit portion 70 flows countercurrentwise with respect to the flow of cold air circulating in the second circuit portion 72 in order to improve the exchanges of heat between the hot and cold air flows.

Thus, the second inlet 72.1 is positioned above the primary structure 60 of the pylon and the second outlet 72.2 is positioned below the primary structure 60 of the pylon.

According to an embodiment, the first inlet 70.1 and the second outlet 72.2 are positioned in the one plane P1 perpendicular to the axis A68 and positioned below the primary structure 60 of the pylon. The first outlet 70.2 and the second inlet 72.1 are positioned in the one same plane P2 perpendicular to the axis A68 and positioned above the primary structure 60 of the pylon.

According to an embodiment, the heat exchanger 68 takes the form of a compact cylinder extending between the planes P1 and P2.

The heat exchange device 66 also comprises a third duct 80 which has a first end connected to the second inlet 72.1 and is configured to tap cold air from the secondary flow 55; and a fourth duct 82 which has a first end connected to the second outlet 72.2 and is configured to deliver the cold air to the engine 54, more particularly to the "core" zone of the engine 54 positioned in the central case 54.2.

According to one configuration, the third duct 80 has at its second end a scoop 84 which has an opening oriented towards the front so that part of the secondary flow 55 naturally enters the scoop 84. The third duct 80 has, at its first end connected to the second inlet 72.1, a third elbow 80.1 which directs the rest of the third duct 80 towards the front.

As illustrated in FIG. 5, the second duct 78 passes through the wall of the third duct 80 on the outside radius of the elbow 80.1 of the third duct 80.

According to an embodiment, the scoop 84 is positioned at the leading edge of the bifurcation 64, above the primary structure 60.

According to one configuration, the fourth duct 82 comprises, at its second end, an exhaust orifice 86 oriented towards the rear, allowing the cold air flow discharged to be oriented along the engine axis so that it contributes to the thrust of the engine 54. The fourth duct 82 has, at its first end connected to the second outlet 72.2, a fourth elbow 82.1 which directs the rest of the fourth duct 82 towards the rear. As illustrated in FIG. 5, the first duct 76 passes through the wall of the fourth duct 82 on the outside radius of the elbow 82.1 of the fourth duct 82.

According to an embodiment, the exhaust orifice 86 is positioned below the primary structure 60.

In contrast with the prior art, the cold air flow is drawn in, via the scoop 84, above the primary structure 60 and is discharged, via the exhaust orifice 86, below the primary structure 60, thereby making it possible to obtain, in the heat exchanger 68, a flow of cold air that flows countercurrentwise with respect to the flow of hot air.

However, the disclosure herein is not restricted to this embodiment. Thus, the hot and cold air flows may circulate in the same direction, the cold air flow being drawn in below the primary structure 60 and discharged above the primary structure 60.

According to another feature of the disclosure herein, the heat exchanger 68 comprises a fixing system 88 for connecting it to the primary structure 60. Thus, in contrast with the prior art, the heat exchanger 68 is not supported by the secondary structure 62. As a result, the design of this secondary structure 62 can be simplified.

Figure 7:
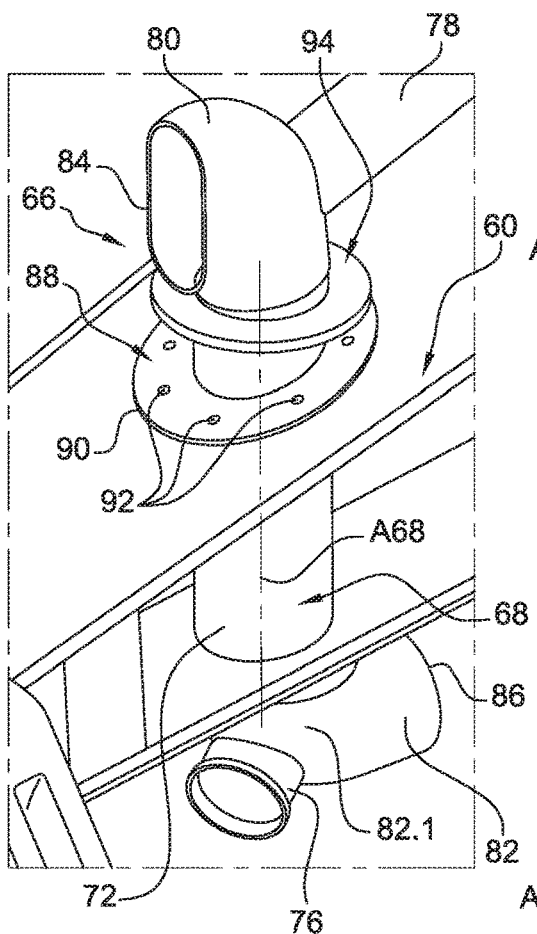
FIG. 7 is a perspective view of an upper part of a heat exchanger equipped with a regulating system, illustrating an embodiment of the disclosure herein.

According to an embodiment visible in FIG. 7, the fixing system 88 comprises an external flange 90 secured to the second circuit portion 72, and configured to be held firmly against an upper face of the primary structure 60; together with fixings 92, such as screws for example, for attaching the external flange 90 to the primary structure 60. Of course, the disclosure herein is not restricted to this fixing system for connecting the heat exchanger 68 to the primary structure 60 of the pylon.

The heat exchange device 66 comprises a regulating system 94 configured to adjust the flow rate of the flow of cold air.

According to one configuration, the regulating system 94 is configured to adjust the flow rate of the cold air circulating between the second circuit portion 72 and the first circuit portion 70.

In order to obtain a compact heat exchange device 66, the regulating system 94 is an orifice-plate regulating system.

The regulating system 94 is positioned in the plane P2, namely at the level of the second inlet 72.1 of the second circuit portion 72.

Figure 8A:
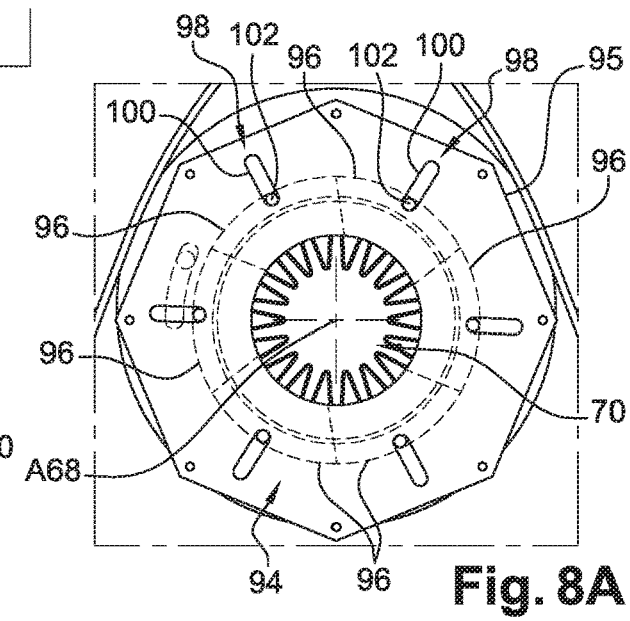
FIGS. 8A and 8B are views from above of the regulating system visible in FIG. 7, respectively in the closed state and in the wide open state.
Figure 8B:
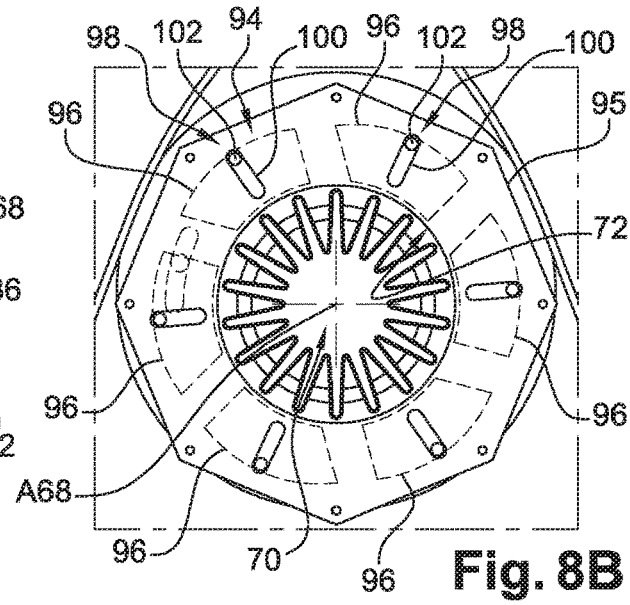

The regulating system 94 is configured so that it can occupy or have:
- a closed state, visible in FIG. 8A, in which it completely closes off the second circuit portion 72, preventing the cold air flow from flowing,
- a wide open state, visible in FIG. 8B, in which it completely uncovers the second circuit portion 72, allowing the cold air flow to flow at a maximum flow rate, and, for preference,
- at least one intermediate state in which it partially uncovers the second circuit portion 72, allowing the cold air flow to flow at a greater or lesser flow rate.

The heat exchange device 66 comprises a control (not depicted) for controlling the state of the regulating system 94.

According to an embodiment visible in FIGS. 8A and 8B, the regulating system 94 comprises a ring 95, coaxial with the axis A68, and at least two disc sectors 96 able to move with respect to the ring 95, in a direction of travel, the disc sectors 96 being configured to occupy or have:
- a position closest to the axis A68, visible in FIG. 8A, in which the disc sectors 96 are touching and close off the second circuit portion 72, this corresponding to the closed state,
- a position furthest from the axis A68, visible in FIG. 8B, in which the disc sectors 96 are spaced apart and completely uncover the second circuit portion 72, this corresponding to the open state, and, for preference,
- an intermediate position, between the closest and the furthest positions, this corresponding to one of the intermediate states.

The embodiment visible in FIGS. 8A and 8B comprises six disc sectors 96, uniformly distributed about the axis A68, each extending over an angular sector of the order of 60°.

The regulating system 94 comprises, for each disc sector 96, a guide system 98 configured to guide each disc sector 96 in the radial direction. According to an embodiment, the guide system 98 comprises, on each disc sector 96, an oblong slot 100 oriented in the direction of travel and, on the ring 95, pins 102, one for each disc sector 96, configured to lodge in one of the oblong slots 100. As an alternative, as illustrated in FIGS. 8A and 8B, the guide system 98 comprises, on the ring 95, an oblong slot 100 oriented in the direction of travel for each disc sector 96 and, on each disc sector 96, a pin 102 configured to lodge in one of the oblong slots 100.

According to a first configuration, the direction of travel is radial (perpendicular to the axis A68) and the oblong slots 100 are oriented radially. In that case, the ring 95 is fixed and the regulating system 94 comprises a mobile second ring configured to pivot about the axis A68 and connected to the disc sectors 96 in such a way that the pivoting of the second ring causes the disc sectors 96 to move radially.

According to a second configuration, the direction of travel is not radial and the oblong slots 100 are oriented in a direction that makes a non-zero angle with the radial direction. In that case, the ring 95 is mobile and the pivoting of the ring 95 about the axis A68 causes the disc sectors 96 to move radially. Of course, the disclosure herein is not restricted to these embodiments for the regulating system 94.

The heat exchange device 66 of the disclosure herein affords the following advantages:

The fact of providing a heat exchanger 68 of the substantially tubular coaxial type means that it can be positioned, at least partially, in the primary structure 60 (in the manner of the hot air supply duct of the prior art). Thus, the impact its integration has on the aerodynamic shapes of the fairing of the secondary structure 62 is limited.

Because the heat exchanger 68 is positioned in the primary structure 60, the fairing of the secondary structure 62 can be positioned as close as possible to the primary structure and/or the space freed up between the secondary structure and the primary structure can be used to integrate other equipment items.

Moreover, because the flow of cold air is discharged into the "core" zone of the engine 54, it contributes to increasing the thrust of the engine.

Finally, because the heat exchange device is connected to the primary structure 60 rather than to the secondary structure 62, the design of the latter is simplified as a result.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft pylon comprising:
   a primary structure configured to connect an aircraft engine and a wing structure;
   a secondary structure comprising an aerodynamic fairing configured to envelope the primary structure on an outside of a nacelle surrounding the engine;
   a bifurcation comprising an aerodynamic fairing configured to envelope the primary structure in a secondary flow ducted between the nacelle and the engine; and
   a heat exchange device comprising:
      a heat exchanger comprising:
         a first circuit portion for ducting a flow of hot air, which has a first inlet and a first outlet;
         a second circuit portion for ducting a flow of cold air, which has a second inlet and a second outlet; and
         a fixing system for connecting the heat exchanger to the primary structure;
      a first duct, which has a first end connected to the first inlet and is configured to tap the flow of hot air off the engine;
      a second duct, which has a first end connected to the first outlet and is configured to convey the flow of cooled hot air towards at least one item of aircraft equipment; and
      an orifice-plate regulating system configured to adjust a flow rate of the flow of cold air, the regulating system comprising:

a ring that is coaxial with a longitudinal axis of the heat exchanger; and at least two disc sectors that are movable with respect to the ring in a direction of travel, wherein the at least two disc sectors are configured to occupy:

a closed position, in which the at least two disc sectors are closest to the longitudinal axis and touching each other, closing off the second circuit portion;

an open position, in which the at least two disc sectors are furthest away from the longitudinal axis and are spaced apart from each other, completely uncovering the second circuit portion; and an intermediate position, between the open position and the closed position;

wherein the first and second circuit portions of the heat exchanger are coaxial, separated by at least one partition that forms an exchange surface, and positioned, at least partially, in the primary structure of the pylon.

2. The aircraft pylon according to claim 1, wherein the first circuit portion for ducting the hot air is positioned inside the second circuit portion for ducting the cold air.

3. The aircraft pylon according to claim 1, wherein the first circuit portion has a cross section configured to increase exchange surface area of the partition and/or the partition has additional exchange surfaces.

4. The aircraft pylon according to claim 1, wherein the first inlet and the first outlet are positioned respectively below and above the primary structure of the pylon, and wherein the second inlet and the second outlet are positioned respectively above and below the primary structure of the pylon so that flow of hot air circulating through the first circuit portion can flow countercurrentwise with respect to flow of cold air circulating in the second circuit portion.

5. The aircraft pylon according to claim 1, wherein the heat exchange device comprises a third duct which has a first end connected to the second inlet and, at a second end, has a scoop that is open towards a front so that part of the secondary flow can naturally enter the scoop, and a fourth duct which has a first end connected to the second outlet and is configured to deliver the cold air into the engine.

6. The aircraft pylon according to claim 5, wherein the scoop is positioned at a leading edge of the bifurcation, above the primary structure.

7. The aircraft pylon according to claim 5, wherein the first duct has, at its first end connected to the first inlet of the heat exchanger, a first elbow configured to direct a rest of the first duct towards a front, wherein the second duct has, at its first end connected to the first outlet of the heat exchanger, a second elbow configured to direct a rest of the second duct towards a rear, wherein the third duct has, at its first end connected to the second inlet of the heat exchanger, a third elbow configured to direct a rest of the third duct towards the front, the second duct passing through a wall of the third duct on an external radius of the third elbow and wherein the fourth duct has, at its first end connected to the second outlet of the heat exchanger, a fourth elbow configured to direct a rest of the fourth duct towards the rear, the first duct passing through a wall of the fourth duct on an outside radius of the fourth elbow.

8. An aircraft comprising a pylon, the pylon comprising:
a primary structure configured to connect an aircraft engine and a wing structure;

a secondary structure comprising an aerodynamic fairing configured to envelope the primary structure on an outside of a nacelle surrounding the engine;

a bifurcation comprising an aerodynamic fairing configured to envelope the primary structure in a secondary flow ducted between the nacelle and the engine; and a heat exchange device comprising:
a heat exchanger comprising:
a first circuit portion for ducting a flow of hot air, which has a first inlet and a first outlet;
a second circuit portion for ducting a flow of cold air, which has a second inlet and a second outlet; and
a fixing system for connecting the heat exchanger to the primary structure;

a first duct, which has a first end connected to the first inlet and is configured to tap the flow of hot air off the engine;

a second duct, which has a first end connected to the first outlet and is configured to convey the flow of cooled hot air towards at least one item of aircraft equipment; and an orifice-plate regulating system configured to adjust a flow rate of the flow of cold air, the regulating system comprising:

a ring that is coaxial with a longitudinal axis of the heat exchanger; and at least two disc sectors that are movable with respect to the ring in a direction of travel, wherein the at least two disc sectors are configured to occupy:

a closed position, in which the at least two disc sectors are closest to the longitudinal axis and touching each other, closing off the second circuit portion;

an open position, in which the at least two disc sectors are furthest away from the longitudinal axis and are spaced apart from each other, completely uncovering the second circuit portion; and an intermediate position, between the open position and the closed position;

wherein the first and second circuit portions of the heat exchanger are coaxial, separated by at least one partition that forms an exchange surface, and positioned, at least partially, in the primary structure of the pylon.

9. An aircraft pylon comprising:
a primary structure configured to connect an aircraft engine and a wing structure;

a secondary structure comprising an aerodynamic fairing configured to envelope the primary structure on an outside of a nacelle surrounding the engine;

a bifurcation comprising an aerodynamic fairing configured to envelope the primary structure in a secondary flow ducted between the nacelle and the engine; and a heat exchange device comprising:
a heat exchanger comprising a first circuit portion for ducting a flow of hot air, which has a first inlet and a first outlet, and a second circuit portion for ducting a flow of cold air, which has a second inlet and a second outlet;

a first duct, which has a first end, which is connected to the first inlet and is configured to tap the flow of hot air off the engine, the first duct comprising, at the first end thereof, a first elbow configured to direct a rest of the first duct towards a front;

a second duct, which has a first end connected to the first outlet and is configured to convey the flow of cooled hot air towards at least one item of aircraft equipment, the second duct comprising, at the first end thereof, a second elbow configured to direct a rest of the second duct towards a rear;

a third duct, which has a first end connected to the second inlet and, at a second end, has a scoop that is open towards a front so that part of the secondary flow can naturally enter the scoop, the third duct comprising, at the first end thereof, a third elbow configured to direct a rest of the third duct towards the front; and a fourth duct, which has a first end connected to the second outlet and is configured to deliver the cold air into the engine, the fourth duct comprising, at the first end thereof, a fourth elbow configured to direct a rest of the fourth duct towards the rear;

wherein the second duct passes through a wall of the third duct on an external radius of the third elbow;

wherein the first duct passes through a wall of the fourth duct on an outside radius of the fourth elbow; and wherein the first and second circuit portions of the heat exchanger are coaxial, separated by at least one partition that forms an exchange surface, and positioned, at least partially, in the primary structure of the pylon.

10. The aircraft pylon according to claim 9, wherein the first circuit portion for ducting the hot air is positioned inside the second circuit portion for ducting the cold air.

11. The aircraft pylon according to claim 9, wherein the first circuit portion has a cross section configured to increase exchange surface area of the partition and/or the partition has additional exchange surfaces.

12. The aircraft pylon according to claim 9, wherein the first inlet and the first outlet are positioned respectively below and above the primary structure of the pylon, and wherein the second inlet and the second outlet are positioned respectively above and below the primary structure of the pylon so that flow of hot air circulating through the first circuit portion can flow countercurrentwise with respect to flow of cold air circulating in the second circuit portion.

13. The aircraft pylon according to claim 9, wherein the scoop is positioned at a leading edge of the bifurcation, above the primary structure.

14. The aircraft pylon according to claim 9, wherein the heat exchanger comprises a fixing system for connecting it to the primary structure.

15. The aircraft pylon according to claim 9, wherein the heat exchange device comprises an orifice-plate regulating system configured to adjust flow rate of the flow of cold air.

16. The aircraft pylon according to claim 15, wherein the regulating system comprises:

a ring that is coaxial with a longitudinal axis of the heat exchanger; and at least two disc sectors that are movable with respect to the ring in a direction of travel.

17. An aircraft comprising at least one aircraft pylon according to claim 9.

* * * * *